United States Patent
Fujiwara et al.

(10) Patent No.: US 7,950,119 B2
(45) Date of Patent: May 31, 2011

(54) BATTERY POLE PLATE GRID PRODUCING METHOD, AND BATTERY PRODUCING METHOD

(75) Inventors: Yoshiomi Fujiwara, Kyoto (JP); Tadashi Nishida, Kyoto (JP)

(73) Assignee: GS Yuasa International Ltd., Kyoto-shi (JP)

( * ) Notice: Subject to any disclaimer, the term of this patent is extended or adjusted under 35 U.S.C. 154(b) by 1299 days.

(21) Appl. No.: 10/523,839

(22) PCT Filed: Aug. 8, 2003

(86) PCT No.: PCT/JP03/10184
§ 371 (c)(1),
(2), (4) Date: Feb. 8, 2005

(87) PCT Pub. No.: WO2004/015795
PCT Pub. Date: Feb. 19, 2004

(65) Prior Publication Data
US 2005/0241126 A1    Nov. 3, 2005

(30) Foreign Application Priority Data
Aug. 9, 2002  (JP) ................... 2002-232556

(51) Int. Cl.
*H01M 4/74* (2006.01)
*H01M 4/04* (2006.01)
*B21D 31/04* (2006.01)

(52) U.S. Cl. .................. 29/2; 29/6.1; 29/623.1
(58) Field of Classification Search .......... None
See application file for complete search history.

(56) References Cited

U.S. PATENT DOCUMENTS

| | | | | |
|---|---|---|---|---|
| 4,247,970 A | * | 2/1981 | Bollinger | ............ 29/2 |
| 5,136,765 A | * | 8/1992 | Tanaka et al. | ......... 29/6.1 |
| 6,691,386 B2 | | 2/2004 | Marlow | |
| 2004/0093704 A1 | | 5/2004 | Marlow | |

FOREIGN PATENT DOCUMENTS

| | | |
|---|---|---|
| JP | 2002-015741 | 1/2002 |
| JP | 2002-15741 A | 1/2002 |
| JP | 2002-260676 | 9/2002 |
| JP | 2002-260676 A | 9/2002 |
| JP | 2003-257435 | 9/2003 |
| JP | 2003-257435 A | 9/2003 |

\* cited by examiner

*Primary Examiner* — John S Maples
(74) *Attorney, Agent, or Firm* — Westerman, Hattori, Daniels & Adrian, LLP

(57) ABSTRACT

The method of producing a grid for a battery electrode plate is characteristic in that in producing a grid formed from a sheet by means of a rotary expander equipped with the disk cutter cluster with disk edge disk cutters, there is a notch that penetrates the outer periphery of the said edge disk cutter in the thickness direction of the said edge disk cutter.

10 Claims, 11 Drawing Sheets

BATTERY POLE PLATE GRID PRODUCING METHOD, AND BATTERY PRODUCING METHOD

FIELD OF INVENTION

The present invention concerns the methods of producing a grid for a battery electrode plate and producing a battery. This application is a 371 of PCT/JP-03/10184, filed 8 Aug. 2003, which is based upon the Japanese patent application 2002-232556, filed 9 Aug. 2002. With this statement, all the content of the Japanese patent application 2002-232556 is included as cited reference in this present Patent Description.

TECHNICAL BACKGROUND

The electrode plate of a lead-acid battery consists of the grids, made of lead or lead alloy, onto the meshes of which an active material is filled. Grids can be produced, apart from the method of forming them directly into the grid shape by e.g. casting lead or lead alloy, with the method of forming meshes with an expander on the lead sheet made of lead or lead alloy. There are two types of expanders: the reciprocal type, which forms meshes sequentially from each end of the lead sheet by vertical motions of a dice cutter, and the rotary type, which employs a disk cutter that in rotation forms zigzag pattern slits on the lead sheet. In the latter type this lead sheet is then stretched toward both of its ends, expanding slits onto the grids. A grid that has been produced with the rotary method is called the rotary expanded grid. The device of the rotary type that produces grids is called a rotary expander.

As FIG. 7 shows, in the middle disk cutter (1) of a disk cutter used for the rotary expander, a number of ridges that are relatively long in their circumferential direction (1a) and a number of valleys that are relatively short (1b) are alternately placed at the periphery of a metal disk along this circumferential direction. Each of the ridges (1a) has a peripheral side face formed that protrudes toward the outer periphery further from reference circumferential face with a predetermined radius from the center of axle of the middle disk cutter (1). This reference circumferential face is planimetrically shown in the enlarged picture in the oval shape of FIG. 7. A peripheral side face with this reference circumferential face is formed for each of the valleys (1b). Also, for each of the valleys (1b), a groove (1c) that opens on the peripheral side face of the corresponding valley (1b) is formed. Each groove (1c) is found on the side of the disk opposing to the adjacent grooves (1c) across a ridge (1a). This is to say that on each side of the middle disk cutter (1), there is a groove (1c) for every other valley (1b). This also means that the valley (1b) with a groove (1c) on one side of the disk and the valley (1b) with a groove (1c) on the opposite side of the disk are adjacent to each other, alternately placed along the circumference. Generally, these grooves (1c) are formed on a disk side of the middle disk cutter (1) and have approximately the same size in width as the circumference of the valleys (1b) in the circumferential direction, as well as approximately half the size of the thickness of the middle disk cutter (1) in depth in the thickness direction of the disk. These grooves (1c) open at the valleys (1b) on the peripheral side face. Furthermore, the widths of the grooves (1c) of a middle disk cutter (1) in the radial direction are of a fixed length toward the center of axle from the peripheral side face.

A plurality of the above-described middle disk cutters (1) constitute disk cutter rolls (2), by being fixed in juxtaposition on the shared rotation shaft, separated from each other by such means as spacers (not displayed) with approximately the same distance as the thickness of the middle disk cutter (1). Two of these cutter rolls (2) are then placed opposite to each other vertically (or horizontally), as shown in FIG. 8. A lead sheet (3) is then inserted therebetween along the metal sheet conveyor guide (5), forming a number of zigzag slits (3a) (NB: there are also cases where three or more, instead of two, disk cutter rolls (2) are used). In this process, the top and bottom middle disk cutters (1) are placed so that the valleys (1b) will only slightly overlap with each other, as well as shifted by half a pitch toward the axis so that each of the top middle disk cutters (1) can be between the bottom middle disk cutters (1), as shown in (a) and (c) of FIG. 9. Also as shown in FIG. 9(a), the phase in the rotating direction is adjusted so that when the valley (1b) of the bottom middle disk cutter (1), with a groove (1c) on one side (right side in the Figure) of the disk, reaches the top edge, the valley (1b) of the top middle disk cutter (1), with a groove (1c) on the opposite side (left side in the Figure), reaches the bottom edge. Therefore, as shown in FIG. 9(b), the ridge (1a) of the top middle disk cutter (1) reaches the bottom edge when the ridge (1a) of the bottom middle disk cutter (1) reaches the top edge. Furthermore, as shown in FIG. 9(c), when the valley (1b) of the bottom middle disk cutter (1), with a groove (1c) on one side (left side in the Figure) of the disk, reaches the top edge, the valley (1b) of the top middle disk cutter (1), with a groove (1c) on the opposite side (right side in the Figure), reaches the bottom edge.

This set of two disk cutter rolls (2) combined and opposed to each other is called a disk cutter cluster. At each end of a disk cutter cluster, an edge disk cutter (4) is attached (in FIG. 9 one edge disk cutter (4) is placed on each side of the bottom disk cutter roll (2)). On the periphery of an edge disk cutter (4), ridges (4a) and valleys (4b) are alternately placed, as in FIGS. 10 and 11. The compositions of the valley (4b) and of the groove (4c) formed on this valley (4b) is the same as those of a middle disk cutter (1) valley (1b) and of its groove (1c), but on the ridge 4a, a peripheral side face consisting of a reference circumferential face is formed. Namely in this edge disk cutter (4), the ridge (4a) does not protrude toward the outer periphery, nor does the valley (4b) take a relatively dented shape compared with this ridge (4a). Such an edge disk cutter (4) is placed at each end of a bottom disk cutter roll (2), in such a way that it will become adjacent to and outside the middle disk cutter (1) at each end of the top disk cutter roll (2).

When a lead sheet (3) is guided to the disk cutter cluster of the above-described composition along its metal sheet conveyor guide (5), the lead sheet (3) is cut as the ridges (1a) of the top and bottom middle disk cutters (1) overlap, as shown in FIG. 9(b) and FIG. 8. As a result, slits (3a) are formed on the lead sheet (3). Furthermore, thin and long wires (3b), formed between a plurality of slits (3a) adjacent to each other on the lead sheet (3) in the width direction, protrude vertically in a ridge-like shape from the sheet surface of the lead sheet (3) alternately, as they are pushed by the top and bottom ridges (1a). Thus, as shown in FIGS. 9(a) and (c) as well as in FIG. 8, slits (3a) are continually formed as the lead sheet (3) is being cut at the adjacent valleys (1b), at which the grooves (1c) of the top and bottom middle disk cutters (1) are faced back to back, as the peripheral side faces of the valleys (1b) slightly overlap with each other. On the other hand, the lead sheet (3) is not cut where the grooves (1c) are faced head on at the adjacent valleys (1b), as the peripheral side faces of the valleys (1b) do not overlap. Here nodes (3c) are formed instead of slits (3a). Thus slits (3a) of the length twice the size of a ridge of the ridge-shaped wires (3b) pushed by ridges (1a) are formed on the lead sheet (3), while no slit is formed on nodes (3c). Namely these slits (3a) and nodes (3c) are alternately formed continually toward the direction in which the sheet is conveyed. Also, those slits (3a) adjacent on the lead sheet (3) in the width direction show a zigzag pattern as in the circled horizontal projection in FIG. 8, as nodes (3c) are formed with half a pitch shifts.

As shown in FIG. 9(b), the ridges (4a) of edge disk cutters (4) in the bottom disk cutter roll (2) overlap with the ridges (1a) of middle disk cutters (1) at each end in the top disk cutter roll (2).This causes the lead sheet (3) to be cut, slits (3a) to be formed and wires (3b) to be protruded downward in a ridge shape. The valleys 4b and 1b slightly overlap with each other also at the adjacent part where the grooves (4c) at the valleys (4b) of the bottom edge disk cutters (4) at both ends are faced back to back with the grooves (1c) at the valleys (1b) of the top middle disk cutters (1) at both ends, as demonstrated in FIG. 9(a) (right end) and in FIG. 9(c) (left end). This causes the lead sheet (3) to be cut and slits (3a) to be continually formed. However, the peripheral side faces of the valleys 4b and 1b do not overlap with each other at the adjacent part where the grooves (4c) at the valleys (4b) of the bottom edge disk cutters (4) at both ends are faced head on with the grooves (1c) (the left end in FIG. 9(a) and the right end in FIG. 9(c)), due to the grooves 4c and 1c. Thus the lead sheet (3) is not cut and instead the edge node (3d) is formed that is similar to a node (3c). It should be noted that slits (3a) are not formed at the outer end of the edge node (3d): this means that the edge node (3d) is directly joined with the frame portion (3e), which is formed at each end in the width direction of the lead sheet (3).

The lead sheet (3) with a number of slits (3a) formed on it in the above-described manner is then stretched toward both ends in the width direction in a post-process. Consequently these slits (3a) are expanded so as to form meshes, as shown in FIG. 12. Namely, a grid is formed whose nodes (3c) and edge nodes (3d) are connected by means of wires (3b). Attention is herewith drawn to the fact that, while in reality each node (3c) is pulled by the wire (3b) in expansion and leans toward the direction in which the wire is contorted, simplified FIG. 12 does not show such contortion.

Also noted is that while edge disk cutters (4) are installed at both ends of the bottom disk cutter roll (2) in the case discussed above, it is possible that edge disk cutters (4) are installed at both ends of the top disk cutter roll (2), or that one edge disk cutter is installed for the bottom disk cutter roll (2) while the other is for the top disk cutter roll (2).

In some cases, a plurality of disk cutter rolls (2) are installed for the same rotation shaft, resulting in a plurality of disk cutter clusters for a pair of rotation shafts. This makes it possible for grids to be formed simultaneously in a number of rows. In this case, edge disk cutters (4) will be installed for both ends of each disk cutter cluster.

In the above described nodes (3c) and edge nodes (3d) of a lead sheet (3), as shown in FIGS. 9(a) and (c), their both ends in the width direction (horizontal direction in the Figure) are pressed by valleys (1b) of a middle disk cutter (1) or valleys (4b) of an edge disk cutter (4), where their grooves (1c and 4c) are faced head on, in the vertically opposite directions. Therefore, deformation in the vertical direction that is no smaller than the lead sheet (3) thickness is caused at both ends in the width direction in nodes (3c) or in edge nodes (3d). Furthermore, the intervening parts of the two slits (3a) juxtaposed in the length direction becomes thinner as a result of this deformation in nodes (3c) or in edge nodes (3d).

A problem has been observed for a lead-acid battery that uses the conventional rotary expanded grid produced with the conventional rotary expander described above: heavy corrosion takes place in the edge nodes of a grid when charge-discharge is repeated. This leads to another problem, namely a reduction in the electric current collection capability of a grid. This is because the cross-section area of the electrically conductive part of an edge node (3d), which has already been thinned in expansion, becomes susceptible to be reduced further in size due to the corrosion. Furthermore, more heat is generated when the cross-section area of the electrically conductive part of an edge node (3d) is reduced in size, due to an increased current density in charge-discharge. This leads to the problem of an increased likelihood of meltdown in the said part. In particular, the electric current collection performance of a grid deteriorates considerably when a rupture is caused at the edge node (3d) that is connected with the frame, among the frames at both ends (3e), where a lug is formed, as it collects electric currents of an electrode plate. There also is a problem in the case that such a rupture is caused at the edge node (3d) that is connected with frames (3e) where a lug is not formed. If rupture occurs in a plurality of such edge nodes (3d), these frames (3e) could dangle from electrodes to a position where separators are not opposed. Thus short circuitry could ensue between the electrodes with different polarities. The corrosion of a grid of the above described kind has been an extremely serious problem for negative electrodes rather than for positive electrodes.

The reason for the concentrated corrosion in the edge node of (3d) a grid described above is not entirely clear, but can be inferred as follows. In a grid, the parts where great contortion is caused in the slit (3a) forming process with disk cutter clusters and the expansion process thereafter are edge nodes (3d) and nodes (3c). Among these parts, nodes (3c) are stretched by wires (3b) in expansion and incline toward the direction in which the wires (3b) are contorted. Therefore, the contortion formed at the nodes (3c) when expansion occurs is restricted just by the amount of this inclination. In contrast, the edge node (3d) cannot incline toward the wire (3b) contortion direction when expansion occurs, as it is fixed to the frame (3e). As a result, greater contortion and more minute cracks are caused in expansion at edge nodes (3d) than non-edge nodes (3c). It is presumed that as a result of this, this part of the apparatus tends to become corroded more easily at the time of charge-discharge of a battery.

Apart from the corrosion problem in a grid, another problem has been observed concerning rupture that occurs in a grid by such factors as fatigue due to vibration, when the battery is exposed to vibration in such uses as in a mobile device. Such rupture also tends to occur at edge nodes (3d), where higher likelihood of greater contortion and minute cracks is observed in the case of corrosion. In a lead-acid battery, the mechanical strength is low for the grid of the negative electrode, which is thinner than that of the positive electrode, as the negative electrode is normally formed more thinly than the positive electrode. Consequently the problem of fatigue caused by vibration has been more serious for the negative electrode than the positive electrode.

DISCLOSURE OF INVENTION

The present invention is intended to deal with these circumstances.

The first item of the present invention is characteristic in that it has a notch that penetrates the outer periphery of a said middle disk cutter in the thickness direction of the said edge disk cutter for production of a grid for a battery electrode plate, where the grid is formed from a sheet by means of a rotary expander which is equipped with the disk cutter cluster with edge disk cutters.

With the first item of the invention, it is possible to restrict rupture caused by such factors as corrosion at the edge nodes of a grid.

The second item of the present invention concerns the method of producing a grid for a battery electrode plate, dependent on the first item, characteristic in that the ridges of its said edge disk cutter protrude by no less than 30% of said sheet from the reference plane of the said disk cutter cluster toward the disk cutter roll that is opposed to the disk cutter roll equipped with said edge disk cutters.

The amount of protrusion referred to here is the one observed when the part in a ridge of the edge disk cutter farthest to the rotation shaft of an edge disk cutter protrudes farthest from the reference plane of a disk cutter cluster in a rotation of the edge disk cutter.

Furthermore, the reference plane which the present patent description refers to represents the inferred reference plane (6) that would be formed by the guide plane (5a) in cases wherein, as in FIG. 1, the edge disk cutter is in the disk cutter roll on the side of the metal sheet conveyor guide, as distinguished from the side of the sheet that is conveyed, for the pairs of disk cutter rolls. On the other hand it means, when the edge disk cutter is found on disk cutter roll on the side of the sheet, the plane shifted horizontally toward the sheet by the thickness of the sheet from the inferred reference plane (6) that would be formed by its guide plane (5a). Therefore, when edge disk cutters are attached to different disk cutter rolls at both ends of a disk cutter cluster, there will be different reference planes for these ends.

With the second item of the invention, it is possible to produce a grid that enables production of batteries whose grid edge nodes are resistant to rupture even after charge-discharge tests.

The third item of the present invention concerns the method of producing a grid for a battery electrode plate, dependent on the second item, characteristic in that the ridges of the said edge disk cutter protrude by no less than 70% of said sheet from the reference plane of the said disk cutter cluster toward the disk cutter roll that is opposed to the disk cutter roll equipped with said edge disk cutters.

The amount of protrusion referred to here has the same meaning as in the second item of the invention.

With the third item of the invention, it is possible to produce a grid that enables production of batteries whose grid edge nodes are even more resistant to rupture even after charge-discharge test.

The fourth item of the present invention concerns the method of producing a grid for a battery electrode plate, dependent on to the first item, characteristic in that the ridges of the said edge disk cutter protrude by a height of less than 110% of said sheet from the reference plane of the said disk cutter cluster toward the disk cutter roll that is opposed to the disk cutter roll equipped with said edge disk cutters.

The height of protrusion referred to here is the amount of protrusion observed when the farthest part in a ridge of the edge disk cutter to the rotation shaft of an edge disk cutter protrudes farthest from the reference plane of a disk cutter cluster in a rotation of the edge disk cutter.

The fourth item of the invention elongates the life of disk cutter clusters.

The fifth item of the present invention concerns the method of producing a grid for a battery electrode plate, dependent on the first item, characteristic in that the bottom part of a said notch is positioned on the side of the disk cutter roll equipped with the said edge disk cutters against the reference plane of the said disk cutter cluster.

Being "positioned on the side of the disk cutter roll equipped with the said edge disk cutter against the reference plane of the said disk cutter cluster" in the statement above includes the case of agreeing with the reference plane of the said disk cutter cluster.

With the fifth item of the invention, it is possible to further restrict deformation at the edge nodes of a grid. However, even with the first item of the invention alone without involving the fifth item, it is still possible to restrict deformation sufficiently at the edge nodes of a grid compared with the conventional techniques. An example is the case in which the bottom part of a said notch slightly protrudes from the reference plane of the said disk cutter cluster toward the opposite side of the disk cutter roll equipped with the said edge disk cutter.

The sixth item of the present invention concerns the method of producing a grid for a battery electrode plate, dependent on the first item. It is characteristic in that an inclined surface is formed that contacts with a ridge of said edge disk cutter at least at a part of contact with said notch and approaches a rotation shaft of the edge disk cutter as it proceeds toward the outside of said disk cutter cluster along said rotation shaft.

With the sixth item of the invention, it is possible to restrict deformation at the edge nodes of a grid.

The seventh item of the present invention concerns the method of a grid for a battery electrode plate and is characteristic in that there exists a peripheral side face at the said outer part.

With the seventh item of the invention it is possible to restrict chips of the edge disk cutter.

The eighth item of the invention concerns the method of producing a battery and is characteristic in that a grid for a battery electrode plate is used that has been produced in accordance with the first item.

With the eight item of the invention, it is possible to produce a battery whose grid edge nodes are resistant to rupture caused by such factors as corrosion.

THE BEST MANNER IN WHICH TO IMPLEMENT THE INVENTION

Hereinafter, embodiments of the present invention will be described with reference to the accompanying drawings.

Figure 1:
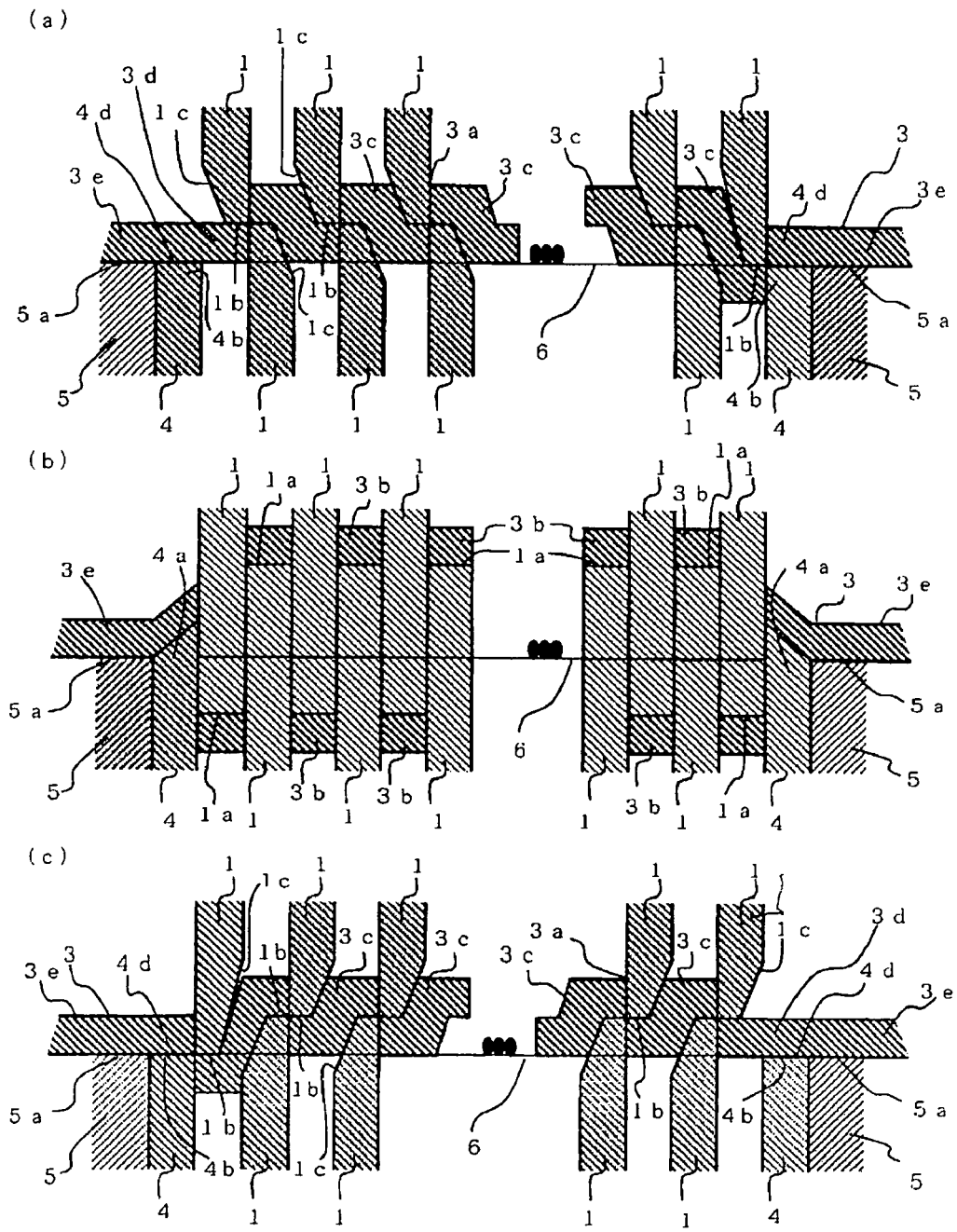
FIG. 1a shows an embodiment of the present invention, illustrating the disk cutters of the top and bottom disk cutter rolls forming slits in the lead sheet when the valleys of the top and bottom middle disk cutters overlap, with front views of enlarged vertical sections of the relevant part.
FIG. 1b shows an embodiment of the present invention, illustrating the disk cutters of the top and bottom disk cutter rolls forming slits in the lead sheet when the ridges of the top and bottom middle disk cutters overlap, with front views of enlarged vertical sections of the relevant part.
FIG. 1c shows an embodiment of the present invention, illustrating the disk cutters of the top and bottom disk cutter rolls forming slits in the lead sheet when the valleys of the top and bottom middle disk cutters overlap, with front views of enlarged vertical sections of the relevant part.
Figure 2:
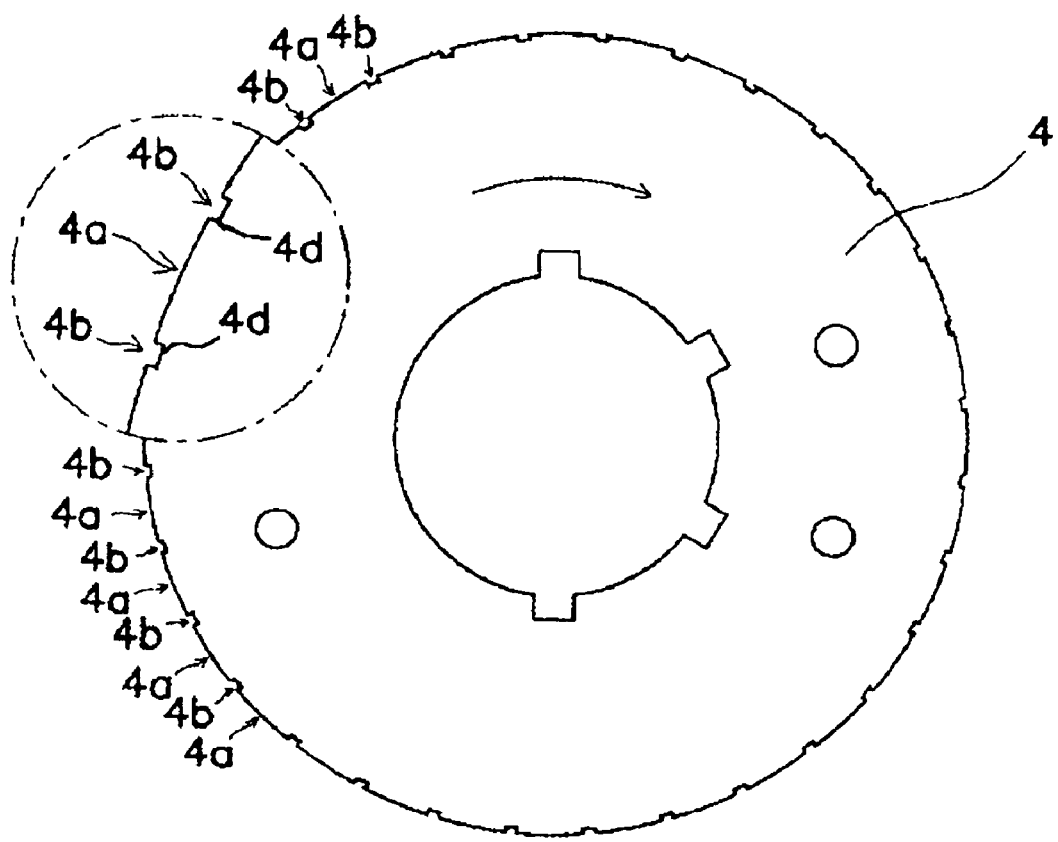
FIG. 2 shows an embodiment of the present invention with a side view that illustrates the composition of an edge disk cutter.
Figure 3:
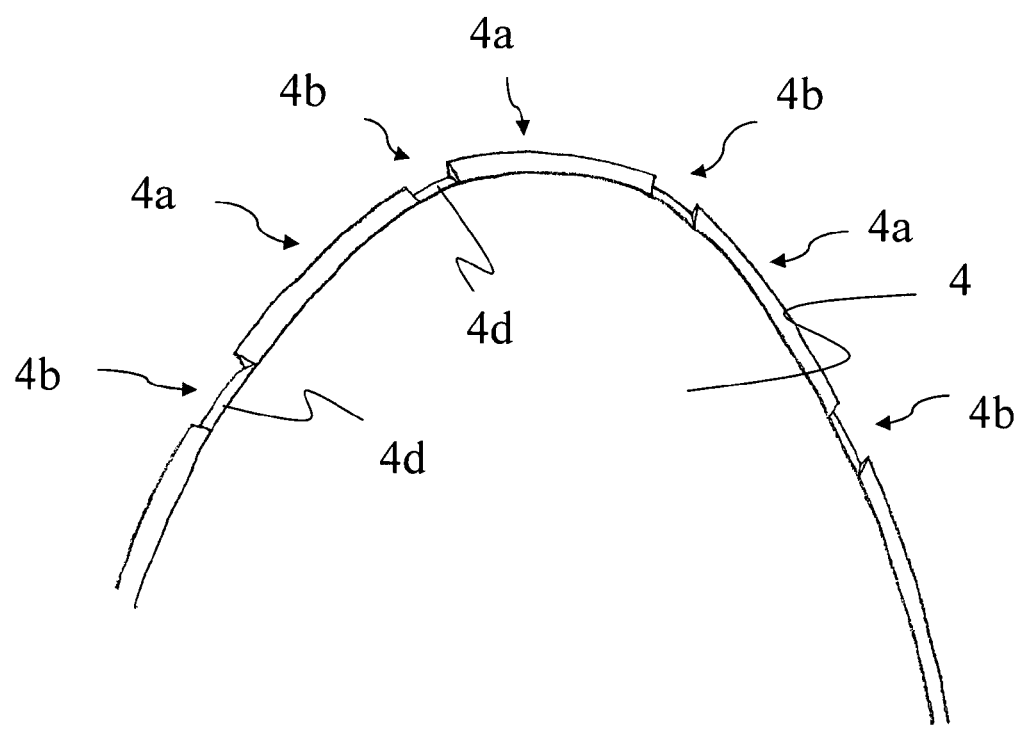
FIG. 3 shows an embodiment of the present invention with an enlarged oblique perspective view of the relevant part of an edge disk cutter.
Figure 4:
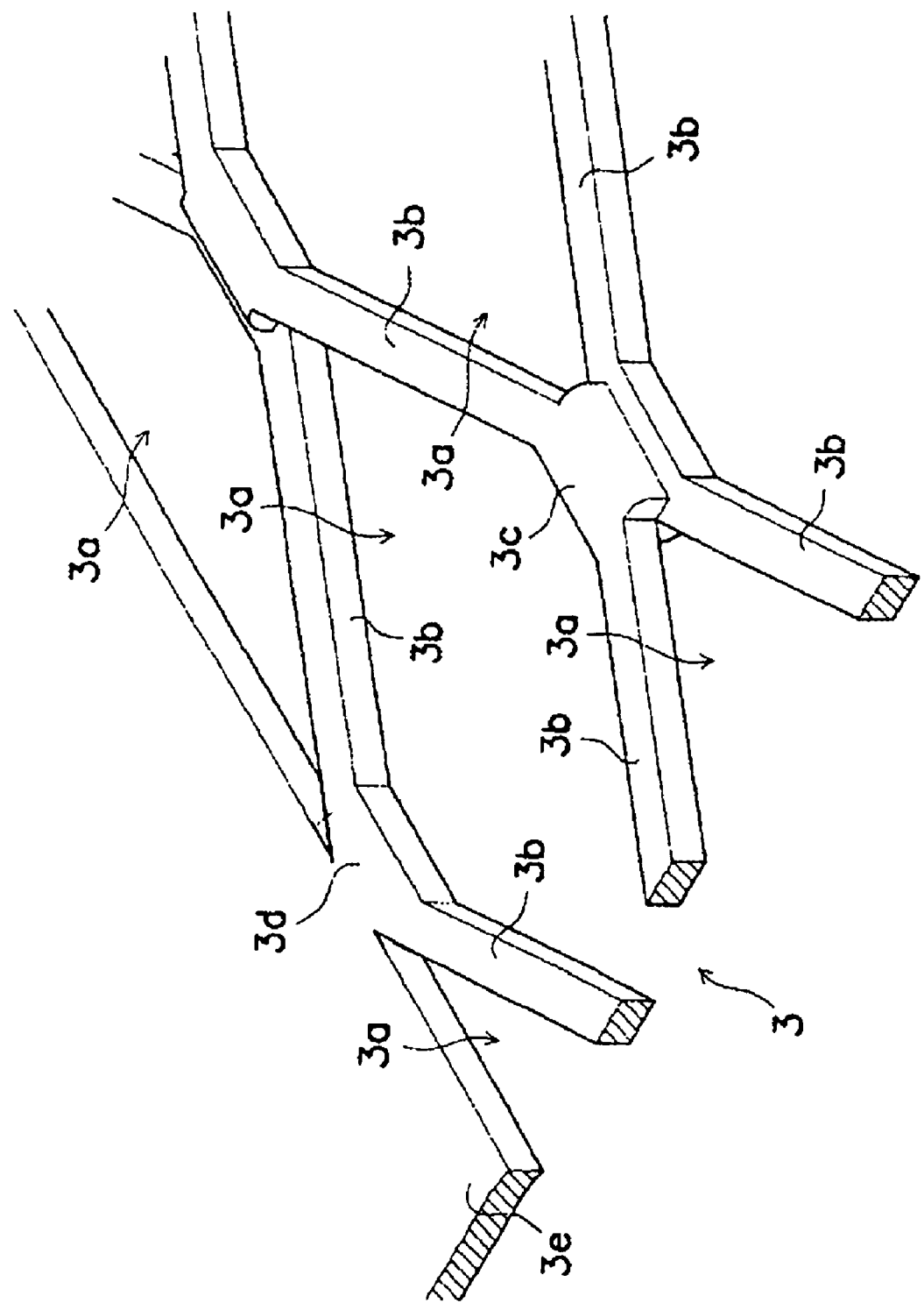
FIG. 4 shows an embodiment of the present invention with an enlarged oblique perspective view of the part close to the edge node in a grid in which the slits formed on the lead sheet have been expanded.
Figure 5:
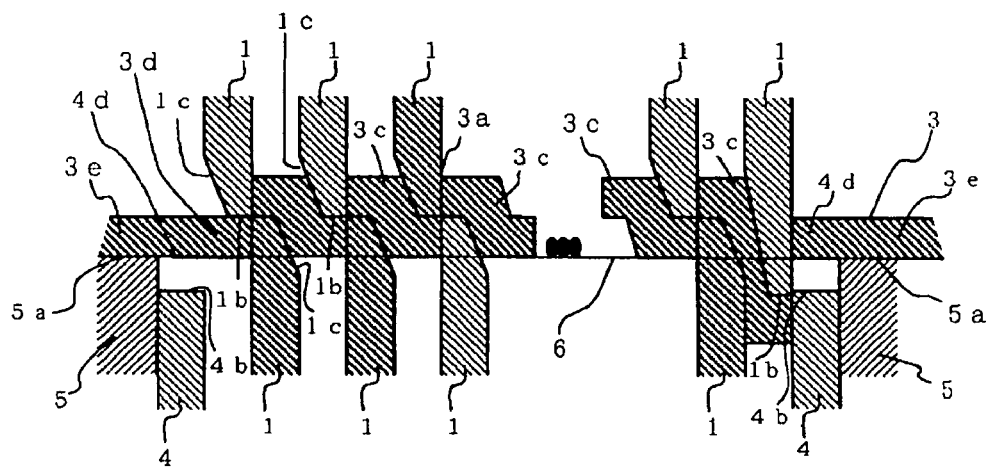
FIG. 5 shows an embodiment of the present invention with front views of enlarged vertical sections of the relevant part that shows the process of forming slits on a lead sheet using the edge disk cutter whose peripheral side face of the valley is positioned below the upper surface of the guide.
Figure 6:
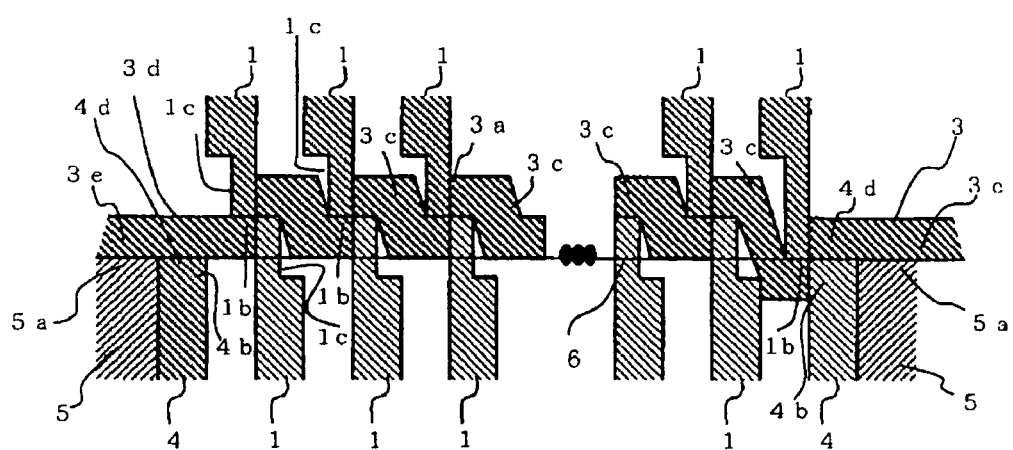
FIG. 6 shows an embodiment of the present invention with front views of enlarged vertical sections of the relevant part that shows the process of forming slits on a lead sheet using a disk cutter of a different shape.

FIGS. 1-6 each describe an embodiment of the present invention. FIG. 1 is a set of front views of enlarged vertical sections of the relevant part that shows the process of forming slits on a lead sheet using the disk cutter of the top and bottom disk cutter rolls. FIG. 2 is a side view that shows the composition of an edge disk cutter. FIG. 3 is an enlarged oblique perspective view that shows the composition of an edge disk cutter. FIG. 4 is an enlarged oblique perspective view of the part close to the edge node in a grid in which the slits formed on the lead sheet have been expanded. FIG. 5 shows another embodiment of the present invention with a set of front views of enlarged vertical sections of the relevant part that shows the process of forming slits on a lead sheet using the disk cutter of the top and bottom disk cutter rolls. FIG. 6 shows yet another embodiment of the invention, with a set of front views of enlarged vertical sections in the case wherein the shape of a groove at the valley of a middle disk cutter is different. The components with the same functions as those of the conventional art example shown in FIGS. 7 to 12 are marked with the identical reference numerals.

Figure 8:
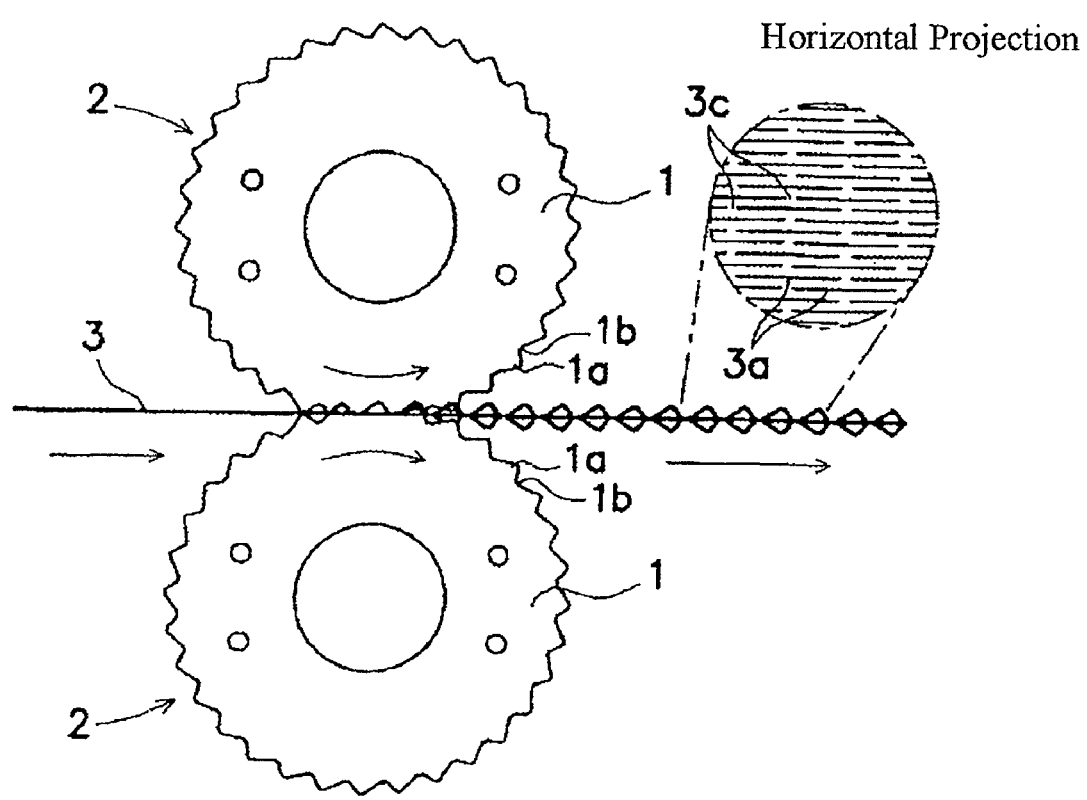
FIG. 8 is a conventional art example with a side view that shows the process of forming slits on the lead sheet using the disk cutter with a rotary type expander.

For the present embodiment of the invention, the rotary expander that is utilized to produce a grid to be used for the electrode plate of a lead-acid battery shall be described first. In this rotary expander, as shown in FIG. 8, slits of the zigzag pattern (3a) are formed on a lead sheet (3) as the lead sheet (3) is passed between the top and bottom disk cutter rolls (2) along the guide plane (5a) of the metal sheet conveyor guide (5) (not displayed in the Figure). The top disk cutter roll (2) has the same composition as the conventional art examples. The bottom disk cutter roll (2) has also the same composition as the conventional art examples in that edge disk cutters (4) are set out at both ends of a plurality of middle disk cutters (1). However, its edge disk cutter (4) composition is different from the conventional art examples.

The present embodiment of the edge disk cutter (4) has the same configuration as the conventional art examples in that ridges (4a) and valleys (4b) are alternately placed on its outer periphery, as indicated in FIGS. 2 and 3. However, unlike the case of middle disk cutter (1), the shape of a ridge (4a) of the edge disk cutter (4) is not necessarily ridge-like. In the examples in FIGS. 2 and 3, a ridge (4a) of the edge disk cutter (4) is formed by the peripheral side face composed of the reference circumferential face of a fixed radius with its center at the center of axle of an edge disk cutter (4). A valley (4b) is placed between such ridges (4a). At valleys (4b) (edge node forming parts), grooves (4c) as in the conventional art examples are not formed and notches (4d), dented to the center of axle than the ridges (4a) adjacent to both ends and penetrating the edge disk cutter (4) in its thickness direction, are formed. This means that the parts excluding the notches (4d) in an edge disk cutter correspond to ridges (4a), in the examples in FIGS. 2 and 3. The interval between valleys (4b) for the edge disk cutter (4) in the present embodiment is twice as long as that between valleys (1b) of the middle disk cutter (1) of FIG. 7 or that between valleys (4b) in the conventional edge disk cutter (4) of FIG. 10. Thus in the present embodiment, valleys (4b) only exist in the same positions as half of the valleys (1b and 4b), among the valleys (1b) of the middle disk cutter (1) and those (4b) of the conventional edge disk cutter (4), where grooves (1c and 4c) are found on the same side of the disk cutter.

Attention is drawn to the fact that the bottom part of a notch (4d) need not be a plane near parallel to the reference circumferential face, as depicted in the Figure. It can be a plane equipped with a taper which is oriented toward either of the planes of the edge disk cutter (4) in the direction toward the center of axle. The shape of the taper can be a either flat or curved plane, or a combination of the two.

Figure 9:
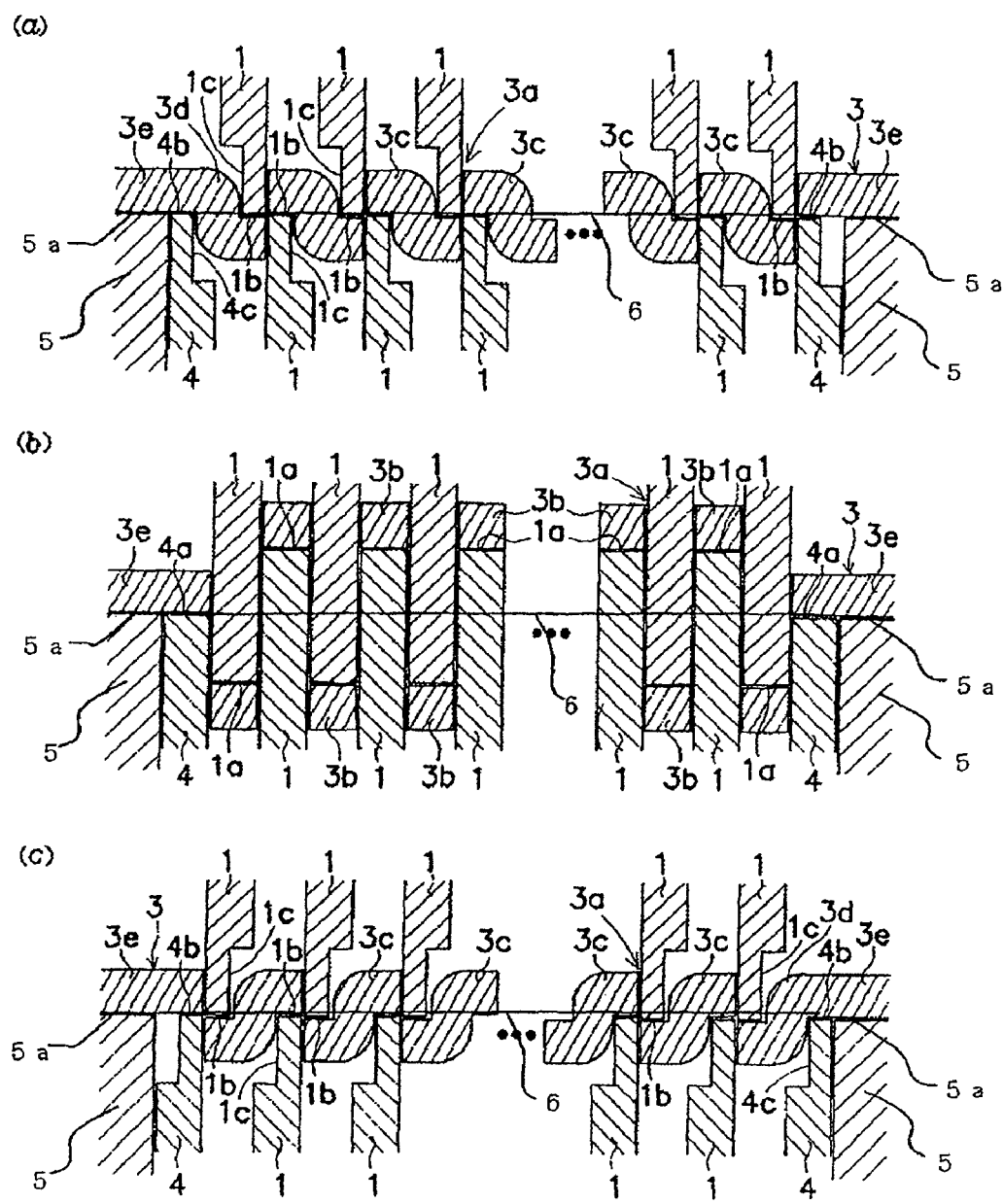
FIG. 9a shows an embodiment of the conventional art example, illustrating the disk cutters of the top and bottom disk cutter rolls forming slits in the lead sheet when the valleys of the top and bottom middle disk cutters overlap, with front views of enlarged vertical sections of the relevant part.
FIG. 9b shows an embodiment of the conventional art example, illustrating the disk cutters of the top and bottom disk cutter rolls forming slits in the lead sheet when the ridges of the top and bottom middle disk cutters overlap, with front views of enlarged vertical sections of the relevant part.
FIG. 9c shows an embodiment of the conventional art example, illustrating the disk cutters of the top and bottom disk cutter rolls forming slits in the lead sheet when the valleys of the top and bottom middle disk cutters overlap, with front views of enlarged vertical sections of the relevant part.

The fact that the notch (4d) penetrates the edge disk cutter (4) in the thickness direction leads to suppression of deformation at the edge node (3d), unlike the conventional art examples in FIG. 9. Therefore, the intervening part between two slits (3a) that are placed in the length direction at an edge node (3d) is more resistant against being extended and thinned. As a result, the likelihood of deterioration of electric current collection capability or occurrence of rupture is reduced. The reduction in cases of deformation at the edge node (3d) leads to a reduction in cases of minute cracks being caused in expansion. Thus, heavy corrosion at the edge node (3d) is also suppressed.

Notice that the front side of an edge disk cutter (4) in FIG. 3 (Side A) is flat up to the point of the peripheral side face which forms ridges (4a), and is not inclined even near the ridges (4a), while the reverse side (Side B) constitutes an inclined surface near the ridges (4a). However, the present invention is not restricted to such a case. Namely, the whole area near the ridges (4a) of Side B of the edge disk cutter in FIG. 3 need not necessarily be inclined. All that is required is that there exist inclined surfaces only near valleys (4b) among the ridges (4a).

The present invention is not limited to the case, as in the above described example, wherein ridges (4a) are formed from the peripheral side face. Cases wherein there is no peripheral side face and the inclined surface near the ridge (4a) of FIG. 3 reaches Side A of FIG. 3 are included in the present invention, as the effects of the present invention will be obtained. FIG. 1(b) exemplifies such cases. However, it is preferable to have a peripheral side face as in FIG. 3, which will make the edge disk cutter more resistant against chipping.

Edge disk cutters (4) of the above described configuration are placed at both ends of a bottom disk cutter roll (2), in such a way that they will become adjacent to and further outside the normal middle disk cutter (1) at both ends of the top disk cutter roll (2) (the placement of edge disk cutters in the present invention is not limited to this case, as in conventional techniques). Furthermore, the phase in the rotating direction of an edge disk cutter (4) is adjusted in such a way that the edge-node forming valleys (4b) of the edge disk cutter (4) will overlap with the valleys (1b) of the middle disk cutter (1) of the top disk cutter roll (2), which is opposed to its top edge across the lead sheet (3).

A lead sheet (3) is guided along the guide plane (5a) of the metal sheet conveyor guide (5) and is passed between the top and bottom disk cutter rolls (2).

Figure 12:
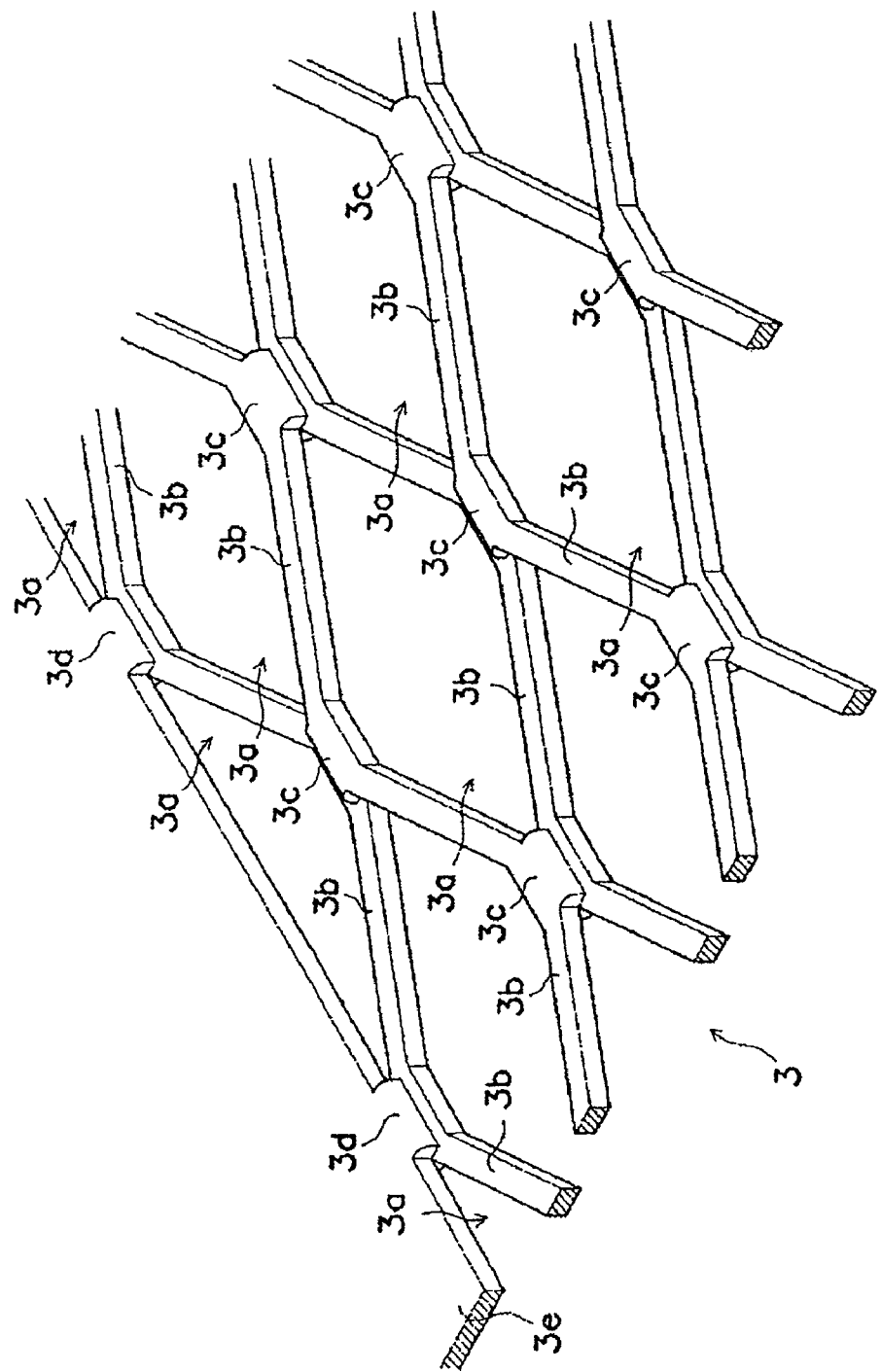
FIG. 12 is conventional art example with an enlarged oblique perspective view of the part close to the edge node in a grid in which the slits formed on the lead sheet have been expanded.

The section of one side (right in FIG. 9(a) and left in FIG. 9(c)) of a conventional node edge (3d) (left in FIG. 9(a) and right in FIG. 9(c)) is, as shown in FIG. 9, below the inferred reference plane (6), formed by the guide plane (5a) of the metal sheet conveyor guide (5). That is to say that an edge node (3d) is deformed by the thickness of the metal sheet (3) downward beneath the inferred reference plane (6) formed by the guide plane (5a). As shown in FIG. 12, the edge node (3d) does not constitute the same flat plane as the metal sheet (3) in the subsequent expansion.

In contrast, in the present embodiment, the bottom of the notch (4d) at the edge-node forming valley (4b) of an edge disk cutter (4) is placed, against the reference plane of the disk cutter cluster, on the side of the disk cutter roll (2) that is equipped with the same edge disk cutter. Namely, the bottom part does not rise upward above the reference plane of the disk cutter cluster in FIG. 1. Nevertheless the bottom part does not sink below the reference plane of the disk cutter cluster when the edge disk cutters (4) are attached on the side of the top disk cutter roll (2) in the Figure. Thus, the edge node (3d) that is formed when the metal sheet passes through the disk cutter cluster is not pressed by its bottom part, as the bottom part is positioned, against the reference plane of the disk cutter cluster, on the side of the disk cutter roll (2) equipped with the same edge disk cutter. Therefore, the likelihood of deformation at the edge nodes (3d) is reduced.

Furthermore, the peripheral side face (outermost periphery), corresponding to the ridges (4a), of an edge disk cutter (4), is positioned on the side of the disk cutter roll (2) that is opposed to the disk cutter roll (2) equipped with the same edge disk cutter (4) against the reference plane of the said disk cutter cluster. Namely, the peripheral side face rises above the reference plane of the disk cutter cluster in FIG. 1. Nevertheless it sinks below the reference plane of the disk cutter cluster when the edge disk cutters (4) are attached on the side of the top disk cutter roll (2) in the Figure. Thus, the likelihood of deformation at the edge nodes (3d) is reduced, as shown in FIGS. 1 and 4.

The way in which deformation at the edge node (3d) is suppressed in the present invention described above is illustrated in FIG. 1 (left in (a) and right in (c)) and FIG. 4.

Figure 7:
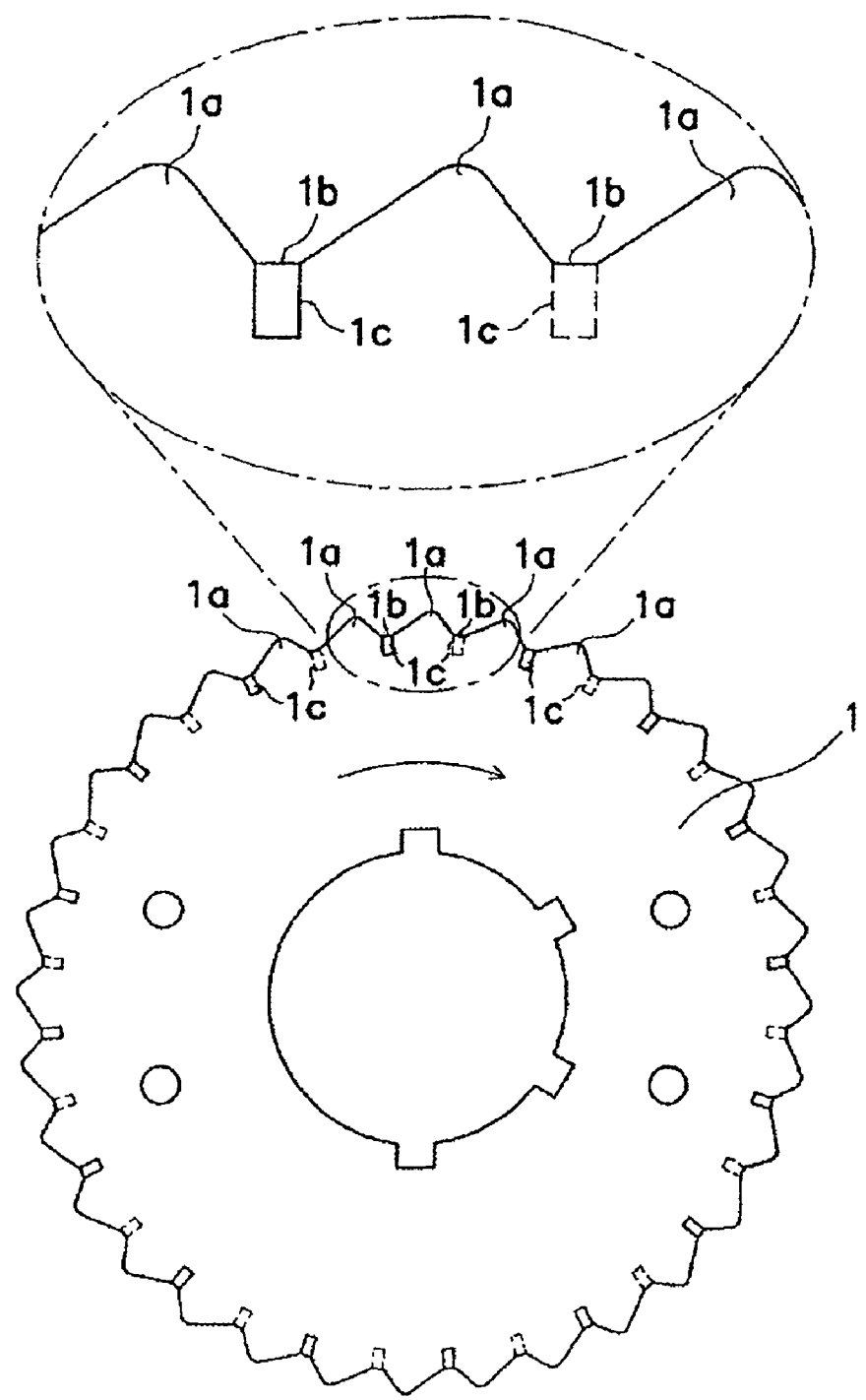
FIG. 7 is a conventional art example in a side view that shows a disk cutter and the composition of the periphery of this disk cutter.
Figure 10:
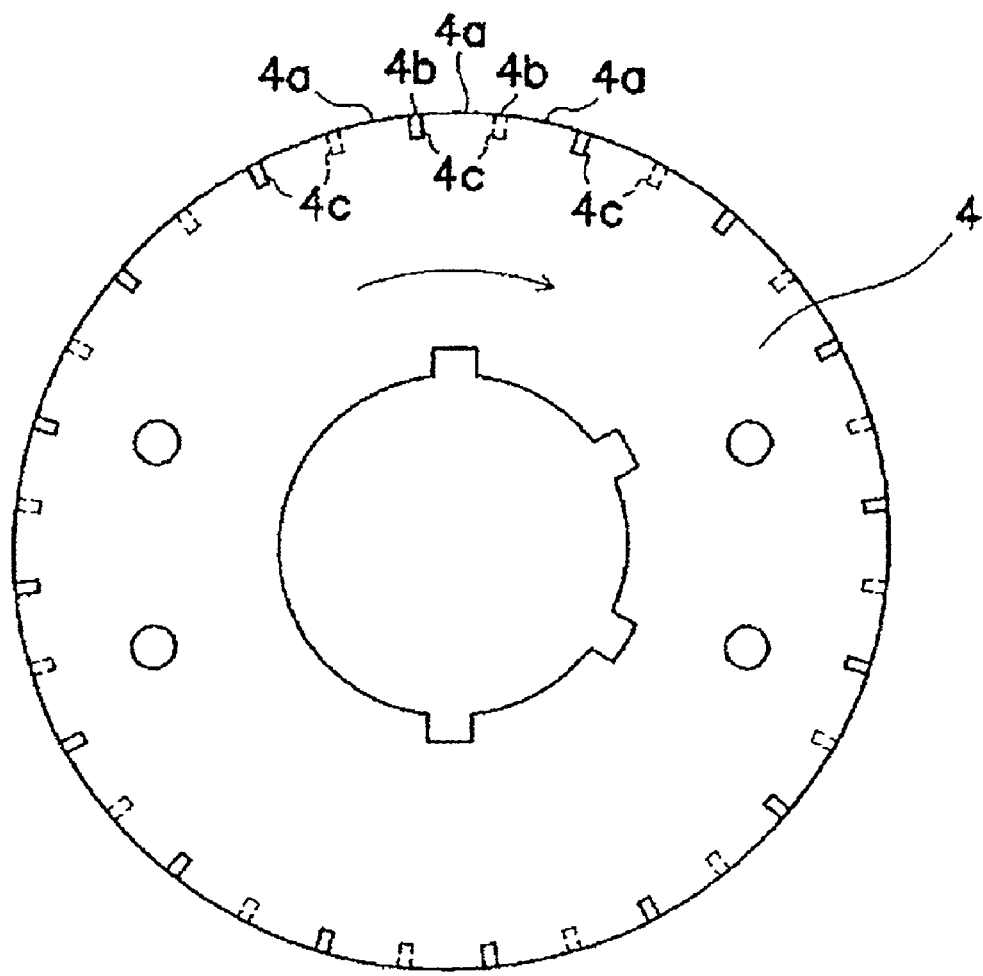
FIG. 10 shows a conventional art example with a side view that shows the composition of an edge disk cutter.
Figure 11:
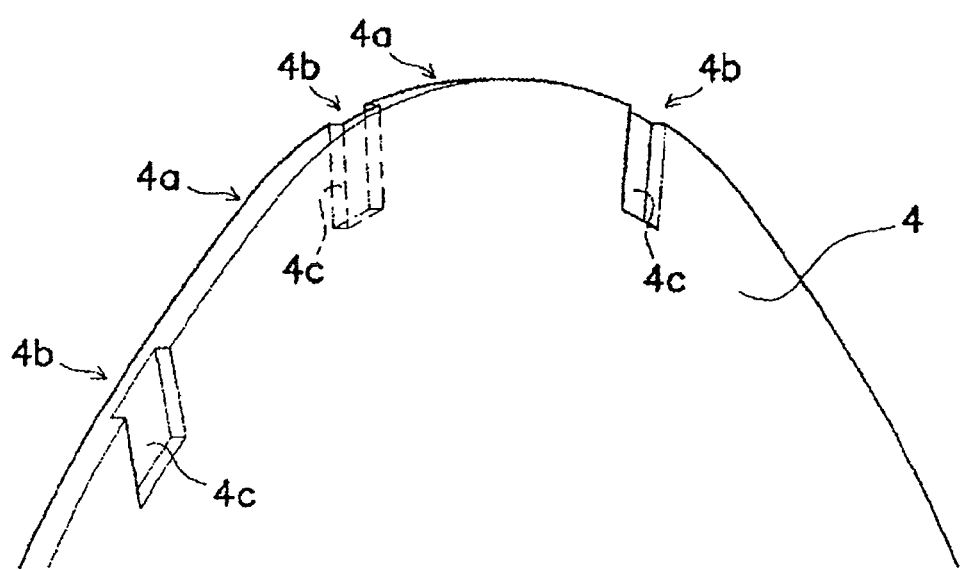
FIG. 11 is a conventional art example in an enlarged oblique perspective view that shows the composition of an edge disk cutter.

Notice that the interval between valleys (4b) for the edge disk cutter (4) in FIG. 1(a) and (c) is equal to that between valleys (1b) of the middle disk cutter (1) of FIG. 7 or that between valleys in the conventional edge disk cutter (4) of FIG. 10. Even in these cases it is possible to produce a grid under the present invention, by adjusting the blade height of the opposing middle disk cutters (1). However, it is preferable to set the interval between valleys (4b) for the edge disk cutter (4) to be twice as long as that between valleys (1b) of the middle disk cutter (1) of FIG. 7 or that between valleys (4b) in the conventional edge disk cutter (4) of FIG. 10. This is to say that it is preferable that the part of the edge disk cutter which is positioned on the right side of FIG. 1(a) or on the left side of FIG. 1(c) should be a ridge (4a) rather than a notch (4d).

When a lead sheet (3) is passed between the top and bottom disk cutter rolls (2) under the present invention described above, slits (3a) are formed, when the valleys (1b) of the top and bottom middle disk cutters (1) overlap, as the lead sheet (3) is cut at the points where the grooves (1c) are faced back to back in the adjacent top and bottom middle disk cutters (1), as shown in FIG. 1(a) and (c). On the other hand nodes (3c) are formed, instead of the lead sheet being cut, at the points where the grooves (1c) are faced head on.

For the valleys (4b) of an edge disk cutter (4), at the edge node forming parts, namely at the parts where they are faced head on with the grooves (1c) of the middle disk cutter (1) of the opposing disk cutter roll (2) (left end in FIG. 1(a), right end in FIG. 1(c)), edge nodes (3d) are formed that are connected with the frame (3e) of the lead sheet (3). The edge node (3d) is connected with the frame (3e) in one of the width directions of the lead sheet (3) (left direction in FIG. 1(a) and right direction). Furthermore, the other end of the edge node (3d) corresponds to the part that is cut with the valleys (1b) of the outermost middle disk cutter (1) in the disk cutter roll (2) that is opposed to the disk cutter roll (2) equipped with the present edge disk cutter (4) and with the valleys (1b) of the outermost middle disk cutter (1) except the edge disk cutter (4) in the disk cutter roll (2) equipped with the present edge disk cutter (4). Notice that deformation by no less than 100% of the sheet thickness occurs in the vertical direction at non-edge nodes (3c), as each edge is pressed and cut both in the upward and downward directions, as in the conventional method. However, no deformation occurs at the edge node (3d) as the bottom of the notch (4d) at the valley (4b) of an edge disk cutter (4) is placed on the side of the disk cutter roll (2) opposed to the disk cutter roll (2) that is equipped with the present edge disk cutter against the reference plane of the disk cutter cluster.

For the valleys (4b) of an edge disk cutter (4), at the valleys (4b) that do not form edge nodes, namely at the parts where they are faced back to back with the grooves (1c) of the middle disk cutters (1) of the opposing disk cutter rolls (2) (right end in FIG. 1(a), left end in FIG. 1(c)), slits (3a) are formed as the edge of the frame (3e) of the lead sheet (3) is cut against the valleys (1b).

When the ridges (1a) of the top and bottom middle disk cutters (1) overlap with each other, slits (3a) are formed as the lead sheet (3) is cut between the adjacent top and bottom middle disk cutters (1), as shown in FIG. 1(b). Moreover, wires (3b) between the slits (3a) are pressed vertically by the ridges (1a) of these middle disk cutters (1). Namely, the wires (3b) are pressed vertically in the ridge shape along the direction in which the lead sheet (3) is conveyed as in the conventional method. Also, the part of lead sheet (3) which contacts with the ridges (4a) of an edge disk cutter (4) constitutes an edge of the frame (3e) as it has been cut against the middle disk cutters (1) of the opposing disk cutter rolls (2). In some of these cases, the section is shifted by 100% of the sheet thickness by these ridges (4a).

The lead sheet (3) with a number of slits (3a) formed on it in the above-described manner is then stretched toward both ends in the width direction in the later process with a rotary expander. Consequently these slits (3a) are expanded so as to form meshes and a grid is formed whose nodes (3c) and edge nodes (3d) are connected with wires (3b) pulled out in the oblique direction. Note that FIG. 4 is a simplified illustration similar to FIG. 12, and hence that the twists of nodes (3c) and wires (3b) are not shown.

In the above composition, no deformation is caused in the vertical direction at the edge node (3d) in the lead sheet (3). Therefore, the concentration of stress onto the edge node (3d) is reduced. This makes the edge node (3d) more resistant against corrosion and heat-up when the wires (3b) are stretched in oblique directions in expansion. Therefore, the likelihood of deformation at the edge nodes (3d) is reduced. There also is the effect of suppressing rupture as the edge node (3d) is not thinned as in the conventional art examples, because no deformation occurs at the edge node (3d). Therefore, the likelihood is reduced of a considerable decrease in the lead-acid battery capacity due to the deterioration of electric current collection capability of a grid, or of short circuitry due to grid deformation.

It should be noted that it is preferable for the shape of ridges (1a) and valleys (1b) to be different in a middle disk cutter (1) adjacent to the edge disk cutter (4) (at both ends of the top cutter roll (2) in FIG. 1) from that of other middle disk cutters (1) in order to prevent deformation at the edge node (3d).

The above description has exemplified an embodiment wherein the bottom of a notch (4d), made at the valley (4b) of an edge disk cutter (4), agrees with the reference plane of the disk cutter cluster. However, there may be a niche between the bottom and the said reference plane as in FIG. 5. Furthermore, the grooves (1c) at the valleys (1b) of a middle disk cutter (1) need not necessarily be of the taper shape in FIGS. 1 and 5 and may be of the staircase shape in FIG. 6.

Also, while edge disk cutters (4) are installed at both ends of the bottom disk cutter roll (2) in the said embodiment, it is possible that one or both of these edge disk cutters (4) are installed at one end or both ends of the top disk cutter roll (2). It is also possible that two or more disk cutter rolls (2) are used to be combined. For example, a lead sheet (3) may be passed between the combination of three disk cutter rolls (2).

Also, while wires (3b) to be connected with the edge node (3d) are formed in the same thickness as wires (3b) to be connected only with nodes (3c) in the above described embodiment, wires (3b) connected with the edge node (3d) may be thicker than wires (3b) connected only with nodes (3c). With such a composition, rupture is suppressed for these thickly formed wires (3b).

Furthermore, although the above described embodiment exemplifies the case wherein a grid is produced to be used for the electrode plate of a lead-acid battery through lead sheet (3) processing, the present invention applies to any battery, including batteries of other kinds than lead-acid battery, that employs a similar grid as its current collecting material for the electrode plate. A metal sheet made of a material appropriate to the kind of such a battery shall be chosen to produce a grid.

EXAMPLE 1

A grid was formed from a 1.8 mm thick lead sheet with a rotary expander identical to the one in FIG. 1 except that edge disk cutters (4) with peripheral side faces on the outer periphery were used as in FIG. 3. As a result, a grid that has no deformation caused at the edge node (3d) and hence has the same thickness for the near whole of the edge node as the lead sheet, as in FIG. 4, was successfully produced.

EXAMPLE 2

A grid under the present invention was produced in the same manner as Example 1 except that the amounts of protrusion were varied of the reference circumferential face of the edge disk cutter (4) (ridges (4a) of the edge disk cutter (4)) from the reference plane of the disk cutter cluster toward the side of the cutter roll opposed to the disk cutter roll equipped with the same edge disk cutter in the range of 50%-100% of the lead sheet thickness. Furthermore, the grid that had been produced in the above manner and been filled with positive active materials in the normal method was left to age and dry, to be used as a positive electrode plate. By combining this positive electrode plate, a negative electrode plate due to the normal method and separators mainly made from microporous polyethylene, a lead-acid battery for automobile was produced that has the capacity of 48 Ah at a 9.6 A discharge (with a voltage around 12V when six cells are connected in series). The battery was completed when it had been provided with dilute sulfuric acid of an appropriate gravity and amount and had been chemically formed.

The section of the edge node after slit forming was examined as its thinnest part was measured. The thickness of this thinnest part against the metal sheet thickness was considered the sheet thickness ratio. If there was no deformation at the edge node the sheet thickness ratio would be 100%. Further, a lifecycle test was conducted on the battery at 42° C. with a cycle of five hour charging at 5A and one hour discharging at 20A. In this lifecycle test, for every 25 cycles, a continuous discharge was conducted until the terminal voltage became 10.2V at 9.6A, and the capacity was checked. The relation between this capacity and the number of cycles is recorded in a graph. The number of cycles at the point when the battery capacity becomes 24 Ah or lower was deemed its life cycles. In a separate investigation, a battery that had undergone 300 cycles of charge-discharge in the same conditions as the lifecycle test above was dismantled in order to examine the rupture rate at the edge node (3d). The results of these examinations are shown in Table 1 below.

TABLE 1

| Ratio of protrusion of reference circumferential face of edge disk cutter against lead sheet thickness (%) | Ratio in thickness of thinnest part of edge node against original sheet after slit forming (%) | Life cycles (100 at 50% protrusion amount of reference circumferential face) | Rupture rate at edge node after 300 cycles (100 at 50% protrusion amount of reference circumferential face) |
|---|---|---|---|
| 50 | 64 | 100 | 100 |
| 70 | 70 | 116 | 32 |
| 80 | 80 | 121 | 25 |
| 90 | 90 | 125 | 7 |
| 100 | 100 | 132 | 0 |

It can be seen from the Table 1 results that the rupture rate at the edge node improves considerably after 300 cycles when the protrusion amount of the reference circumferential face of the edge disk cutter (4) (ridges (4a) of the edge disk cutter (4)) from the reference plane of the disk cutter cluster toward the side of the cutter roll opposed to the disk cutter roll equipped with the same edge disk cutter is 70% or greater.

EXAMPLE 3

A grid under the present invention was produced in the same manner as Example 1 except that the amounts of protrusion were varied of the reference circumferential face of the edge disk cutter (4) (ridges (4a) of the edge disk cutter (4)) from the reference plane of the disk cutter cluster toward the side of the cutter roll opposed to the disk cutter roll equipped with the same edge disk cutter in the range of 0%-120% of the lead sheet thickness. The duration of the disk cutter cluster operation in this production until a chip was or chips were caused in the edge disk cutter cluster was deemed the life of the edge disk cutter. The results of this life duration examination are shown in Table 2 below.

TABLE 2

| Ratio of protrusion of reference circumferential face of edge disk cutter against lead sheet thickness (%) | Life duration of edge disk cutter. (100 at 120% protrusion amount of reference circumferential face) |
| --- | --- |
| 0 | 156 |
| 50 | 145 |
| 70 | 139 |
| 80 | 133 |
| 90 | 131 |
| 100 | 128 |
| 110 | 125 |
| 120 | 100 |

It can be seen from the Table 2 results that the life duration of the edge disk cutter improves considerably when the protrusion amount of the reference circumferential face of the edge disk cutter (4) (ridges (4a) of the edge disk cutter (4)) from the reference plane of the disk cutter cluster toward the side of the cutter roll opposed to the disk cutter roll equipped with the same edge disk cutter is 110% or less.

EXAMPLE 4

Grids under the present invention were produced in the same manner as Example 1 except that the amount of protrusion was set to 50% of the lead sheet thickness for the reference circumferential face of the edge disk cutter (4) (ridges (4a) of the edge disk cutter (4)) from the reference plane of the disk cutter cluster toward the side of the cutter roll opposed to the disk cutter roll equipped with the same edge disk cutter and that grids were produced both in the case wherein an inclined surface was formed that contacts with the ridges (4a) of the edge disk cutter (4) and approaches the rotation shaft as it proceeds in the direction toward the outer part of the disk cutter cluster along the rotary shaft of the edge disk cutter (the case of FIG. 3) and in the case wherein no inclined surface was formed and the ridges (4a) were formed from the outer periphery that is of the same thickness as the edge disk cutter (4). Batteries were produced and were tested in the same way as Example 2 using these grids. The results of these tests are shown in Table 3.

TABLE 3

| Whether or not inclined surfaces exist that contacts edge disk cutter ridges | Ratio in thickness of thinnest part of edge node against original sheet after slit forming (%) | Life cycles (100 when there is no inclined surface) | Rupture rate at edge node after 300 cycles (100 when there is no inclined surface) |
| --- | --- | --- | --- |
| Yes | 64 | 104 | 71 |
| No | 60 | 100 | 100 |

It can be seen from Table 3 that the life cycles of a lead-acid battery improved and rupture at the edge node (3d) is better suppressed when there are inclined surfaces that contact with the ridges (4a) of the edge disk cutter (4).

EXAMPLE 5

A grid under the present invention was produced in the same manner as Example 1 except that the amounts of protrusion were varied in the range from 0-50% of the lead sheet thickness for the reference circumferential face of the edge disk cutter (4) (ridges (4a) of the edge disk cutter (4)) from the reference plane of the disk cutter cluster toward the side of the cutter roll opposed to the disk cutter roll equipped with the same edge disk cutter and that edge disk cutters (4) were used with no inclined surface that contacts with the ridges (4a) of the edge disk cutter (4) and approaches the rotation shaft as it proceeds in the direction toward the outer part of the disk cutter cluster along the rotary shaft of the edge disk cutter. Batteries were produced and were tested in the same way as Example 2 using these grids. The results of these tests are shown in Table 4.

TABLE 4

| Ratio of protrusion of reference circumferential face of edge disk cutter against lead sheet thickness (%) | Ratio in thickness of thinnest part of edge node against original sheet after slit forming (%) | Life cycles (100 when protrusion amount of reference circumferential face is 0%) | Rupture rate at edge node after 300 cycles (100 when protrusion amount of reference circumferential face is 0%) |
| --- | --- | --- | --- |
| 0 | 53 | 100 | 100 |
| 30 | 58 | 105 | 95 |
| 50 | 60 | 108 | 85 |

It can be seen from the Table 4 results that the life cycles of a lead-acid battery and rupture rate at the edge node improve when the protrusion amount of the reference circumferential face of the edge disk cutter (4) (ridges (4a) of the edge disk cutter (4)) from the reference plane of the disk cutter cluster toward the side of the cutter roll opposed to the disk cutter roll equipped with the same edge disk cutter is 30% or greater, compared with the 0% case.

As apparent from the above description, with the methods of producing a grid for a battery electrode plate and of producing a battery of the present invention, deformation at the edge node of a grid is prevented totally or partially. Therefore, rupture at the edge node is suppressed, reducing the likelihood of battery faults and elongating the life of a battery.

Potential for Industrial Usage

As has been seen, the present invention is suitable as a method of producing a grid for a battery electrode plate, whereby corrosion and rupture are suppressed at the edge node. It is also suitable as a method of producing a battery. In particular, it is suitable as a method of producing a grid for a lead-acid battery and as a method of producing a lead-acid battery.

The invention claimed is:

1. A method of producing a grid for a battery electrode plate, comprising the steps of:
   providing a sheet to become the grid for the battery electrode plate;
   providing a rotary expander, and
   forming the grid from the sheet by the rotary expander, wherein said rotary expander comprises a disk cutter cluster comprising:
   a first disk cutter roll having a first middle disk cutter;
   a second disk cutter roll having a second middle disk cutter, the first disk cutter roll and the second disk cutter roll being a pair;
   an edge disk cutter at an outermost end of said disk cutter cluster; wherein the edge disk cutter comprises;
   a first face facing the second middle disk cutter;
   a second face opposite to the first face;
   ridges disposed at a periphery of said edge disk cutter, wherein a notch is interposed between the ridges, wherein the notch is provided at the periphery of said edge disk cutter by penetrating said edge disk cutter in the thickness direction of said edge disk cutter; and
   an inclined surface provided on the ridges such that the ridges have a tip having an acute angle, wherein the acute angle is formed between the first face and the inclined surface, wherein said notch is provided to serve as an edge node forming part.

2. The method of producing a grid for a battery electrode plate according to claim 1,
   wherein each of said ridges protrude by 30% or greater of the thickness of said sheet from a reference plane of said disk cutter cluster.

3. The method of producing a grid for a battery electrode plate according to claim 2,
   wherein each of said ridges protrude by 70% or greater of the thickness of said sheet from said reference plane.

4. The method of producing a grid for a battery electrode plate according to claim 1,
   wherein the height of protrusion of each of said ridges from a reference plane of said disk cutter cluster is 110% or less of the thickness of said sheet.

5. The method of producing a grid for a battery electrode plate according to claim 1,
   wherein a bottom part of said notch is positioned on the second disk cutter roll equipped with said edge disk cutter against a reference plane of said disk cutter cluster.

6. A method of producing a lead-acid battery, comprising the steps of:
   providing a sheet to become a grid for a battery electrode plate;
   providing a rotary expander; and
   forming the grid from the sheet by the rotary expander, wherein said rotary expander comprises a disk cutter cluster comprising:
   a first disk cutter roll having a first middle disk cutter;
   a second disk cutter roll having a second middle disk cutter, the first disk cutter roll and the second disk cutter roll being a pair;
   an edge disk cutter disposed at an outermost end of said disk cutter cluster; wherein the edge disk cutter comprises
   a first face facing the second middle disk cutter;
   a second face opposite to the first face;
   ridges disposed at a periphery of said edge disk cutter, wherein a notch is interposed between the ridges, wherein the notch is provided at the periphery of said edge disk cutter by penetrating said edge disk cutter in the thickness direction of said edge disk cutter; and
   an inclined surface provided on the ridges such that the ridges have a tip having an acute angle, wherein the acute angle is formed between the first face and the inclined surface, and wherein said notch is provided to serve as an edge node forming part.

7. The method of producing a lead-acid battery according to claim 6,
   wherein each of said ridges protrude by 30% or greater of the thickness of said sheet from a reference plane of said disk cutter cluster.

8. The method of producing a lead-acid battery according to claim 7,
   wherein each of said ridges protrude by 70% or greater of the thickness of said sheet from said reference plane.

9. The method of producing a lead-acid battery according to claim 6,
   wherein the height of protrusion of each of said ridges from a reference plane of said disk cutter cluster is 110% or less of the thickness of said sheet.

10. The method of producing a lead-acid battery according to claim 6,
    wherein a bottom part of said notch is positioned on the second disk cutter roll equipped with said edge disk cutter against a reference plane of said disk cutter cluster.

* * * * *